Patented Apr. 30, 1935

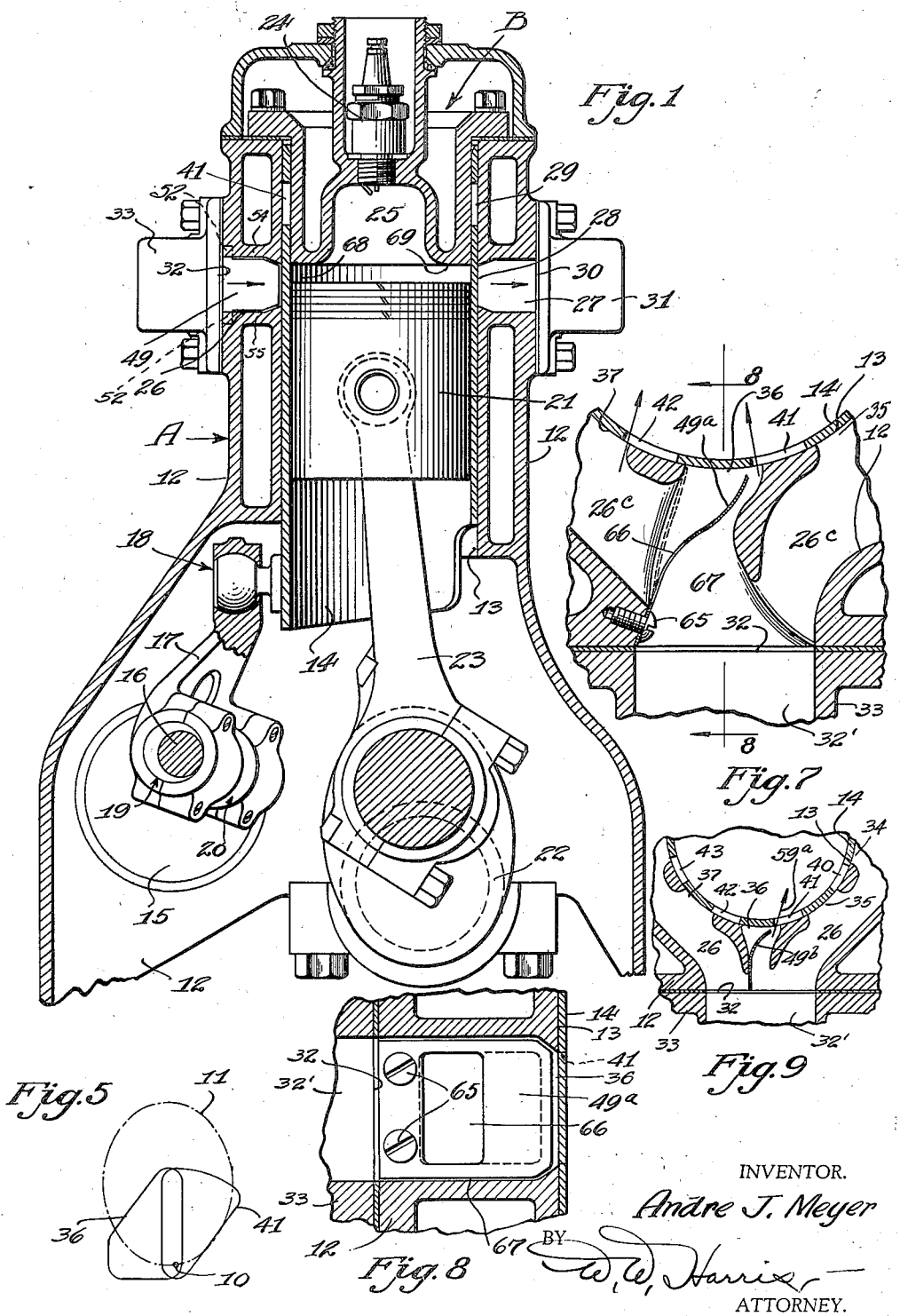

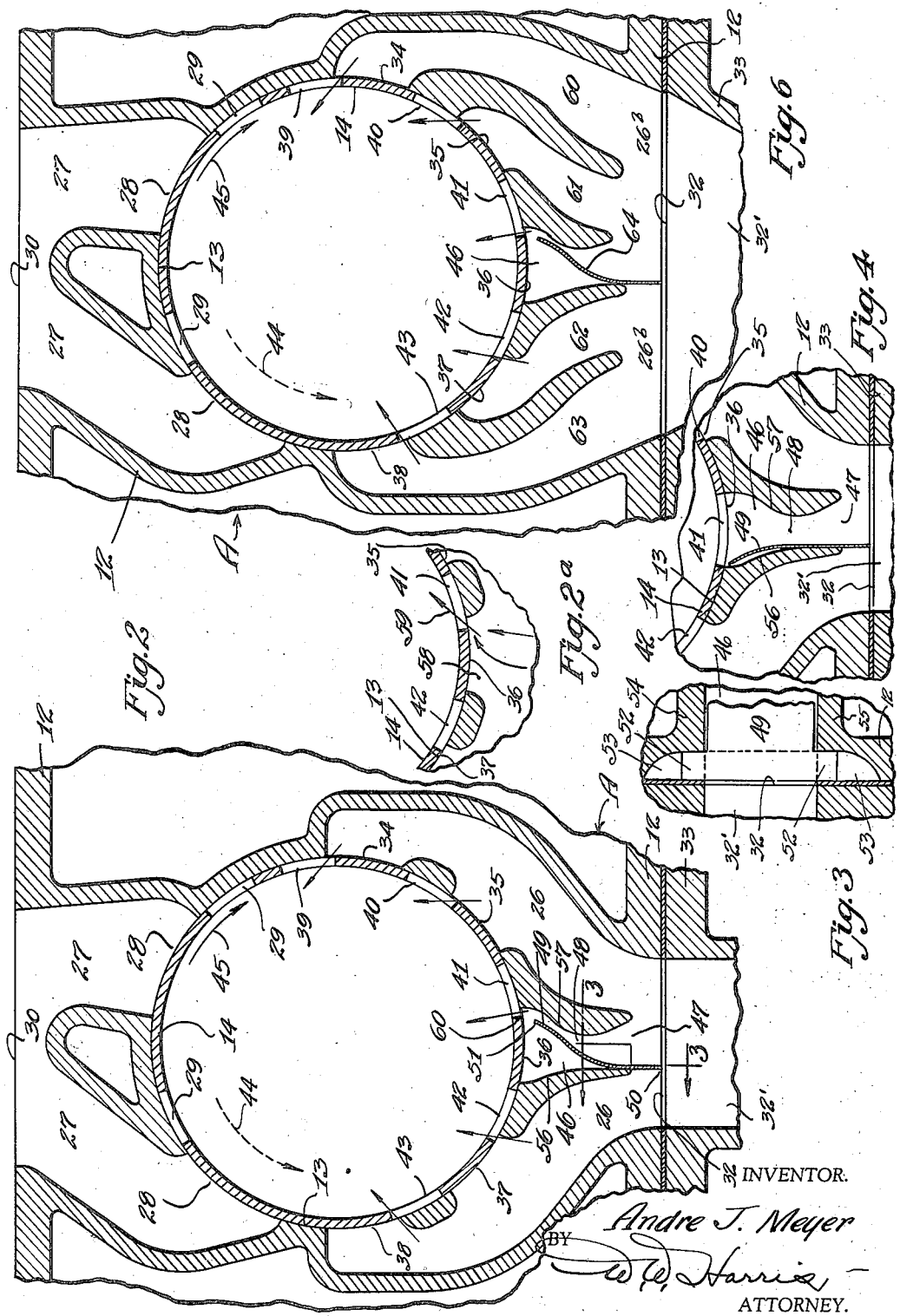

1,999,512

UNITED STATES PATENT OFFICE 1,999,512

INTERNAL COMBUSTION ENGINE AND METHOD OF OPERATING SAME

Andre J. Meyer, Detroit, Mich., assignor to Continental Motors Corporation, Detroit, Mich., a corporation of Virginia Application November 30, 1931, Serial No. 578,022

30 Claims. (Cl. 123—81)

This invention relates to internal combustion engines and methods of operating same and refers more particularly to engines of the sleeve valve type.

My invention is particularly related to the single sleeve valve engine of the combined movement type wherein a single sleeve valve associated with each cylinder is given a combined axial reciprocation and oscillation in performing the valving functions, any point on the sleeve tracing a closed curve path with respect to the cylinder. In this type of engine there is a tendency for the fluid such as gasoline and air commonly referred to as fuel mixture, or air in the case of a compression ignition engine, to swirl about the combustion chamber, the swirl being an important element for obtaining the best performance characteristics of the engine.

In engines of the aforesaid single sleeve valve type the cooperating cylinder and sleeve intake ports open largely during the oscillating component of the sleeve valve travel with the result that the fuel mixture is introduced tangentially into the cylinder or combustion chamber giving rise to a swirling motion of the fuel mixture about an axis parallel and in many cases coincident with the sleeve and cylinder axis.

Now the aforesaid swirl of the fuel mixture is important in obtaining improved characteristics of the engine, such as power, fuel economy, freedom from detonation, torque, etc., but as the swirl is increased as the engine speed and velocity of the fuel mixture intake gases increase, difficulties and disadvantages have been experienced heretofore in the lack of controlling the swirl to the desired amount or degree to obtain the greatest benefits therefrom.

It is an object of my invention to provide novel methods and means for controlling the swirl in engines of the aforesaid type and while great benefits may be derived by my invention in the aforesaid single sleeve valve type of engine, it is not my intention to so limit the scope of my invention since in the broad aspects thereof my invention is applicable to engines having other types of valving devices.

It is a further object of my invention to provide novel methods and means for obtaining and/or controlling the swirl over substantially the entire range of engine performance.

A still further object of my invention resides in the provision of simple and effective methods and means for controlling the swirl to great advantage in internal combustion engines and for reducing and minimizing the swirl tendency due to tangential entry of gas through the intake ports.

In carrying out the objects of my invention I have provided, in the specific embodiments illustrated, a movable device for the fuel mixture conducting means for one or more of the cylinder ports, preferably the cylinder port or ports having the greatest net influence or tendency toward swirl. Thus, where the fuel mixture is conducted to the intake chamber associated with an engine cylinder in a manner substantially symmetrical with the cylinder intake ports, the port or groups of ports to each side of the incoming fuel mixture stream substantially offset each other in their swirl producing tendencies, the central port opposite the incoming fuel mixture being critical in that its swirl producing tendencies are not offset. Such central port is therefore largely the port which produces the net swirl experienced in the cylinder. Thus, I provide movable means in the nature of an orifice device associated with this central port for controlling and preferably reducing the swirl as desired. This movable means may be mechanically actuated from a moving part of the engine or it may be automatically moved in response to the fuel mixture flow, the latter being illustrated and described more in detail hereinafter. In the embodiment illustrated, my movable device or deflecting device is adapted to automatically move or adjust itself with the flow of fuel mixture during intake whereby to govern swirl and preferably to materially reduce the swirl so as to approach a minimum of residual swirl resulting from tangential entry of the gases through the intake ports. Since the port or group of ports tending to produce counter-clockwise swirl (for clockwise sleeve movement illustrated) is somewhat more effective by reason of a more direct tangential fuel mixture flow thereto than the port or group of ports tending to produce opposing clockwise swirl, the net or residual swirl will be counterclockwise, even by substantially neutralizing the swirl tendencies of the aforesaid critical central port.

Having thus minimized and controlled the swirl characteristic which is troublesome since it tends toward excessive swirl at higher engine speeds, I am enabled to obtain a desired amount of swirl by any suitable means which will not become excessive and which will be beneficial over the range of engine speeds. Thus one manner of obtaining this swirl is disclosed in my co-pending application, Serial No. 530,843, filed April 17, 1931, wherein the piston clearance with the cylinder head is utilized to obtain and control the swirl.

My invention is a decided advantage over devices which endeavor to slow down the swirl after it is established, since with such devices I have determined that an excessive swirl once established is difficult if not impossible to effectively and accurately control and also since such devices do not compensate or adjust themselves to conditions of varying engine speeds such as are met with in automotive vehicle practice. Furthermore, by reason of my invention I am enabled to utilize intake chambers substantially symmetrically arranged with respect to the associated groups of intake ports.

In engines of the aforesaid type I have determined that the inherent tendency for the fuel mixture to swirl increases substantially in proportion to increases in engine speeds and in carrying out my invention in the illustrated embodiment the deflecting device for high engine speed promotes engine swirl to any greater extent than at low speed, but to a greatly reduced extent so as to minimize the residual swirl due to tangential port entry of the intake gas. This swirl reduction is affected by a shifting of the deflector associated with the critical port whereby the fuel mixture is introduced substantially radially or slightly tangentially into the cylinder and not tangentially to the extent as has heretofore been customary. Thus the swirl tendency due to fuel mixture intake through the ports is minimized. The desired swirl is then obtained in a manner aforesaid as by the clearance between the piston and cylinder head.

In actual practice for any engine the deflector is positioned to minimize swirl from tangential entry of gases into the cylinder and then the desired amount of swirl is obtained otherwise, as by providing such an amount of clearance between the piston and cylinder head which will give the most desirable engine operating characteristics. By utilizing pistons having gradually increasing head thicknesses the proper clearance may be experimentally determined and then further engines of that size may be readily produced in manufacture as will be apparent. It is not necessary to measure the swirl at any engine R. P. M. in order to obtain the desired amount since engine power, fuel economy, detonation, and like factors resulting from swirl characteristics may be readily noted in the usual well known ways. However, I have determined by experiment, the various swirl speeds which occur over engine ranges with the use of a light, sensitive vane rotor having a rotatable shaft projecting outside the engine combustion chamber, the shaft providing an arcuate means for counting the R. P. M. of the vane located within the combustion chamber. While the most favorable R. P. M. of swirl will vary with different types and sizes of engines, I have found that swirl for ordinary gasoline mixture ranging in the neighborhood of 3,000 to 5,000 R. P. M. is very beneficial in ordinary sizes of single sleeve valve engines, such as are used in the automotive industry.

Further objects and advantages of my invention will be apparent as this specification progresses reference being made to the accompanying drawings in which:

Fig. 1 is a sectional elevation view through a typical cylinder of the engine,

Fig. 2 is a sectional plan view through a typical cylinder in the region of the ports and illustrating the swirl controlling element.

Fig. 2ª is a detail fragmentary view of the conventional gas flow for the center sleeve and intake ports, Fig. 3 is a detail sectional view along the line 3—3 showing the swirl controlling element, Fig. 4 is a detail view of the swirl controlling element with the intake fully open, Fig. 5 is a diagrammatic view showing a typical sleeve and cylinder intake port partially open, Fig. 6 is a view corresponding to Fig. 2 but showing a modified intake chamber construction, Fig. 7 is a detail view of a modified arrangement of swirl controlling element, Fig. 8 is a detail sectional view along line 8—8 of Fig. 7, and Fig 9 is a detail sectional view of a further modified type of intake chamber illustrating my swirl controlling element as promoting a limited amount of swirl.

In the drawings reference character A represents the internal combustion engine herein shown for purposes of illustrating my invention as the four stroke cycle single sleeve valve type, commonly known as the Burt-McCollum type of engine wherein a single sleeve valve associated with each cylinder is given a combined axial reciprocation and oscillation in performing the cyclical events of the engine, any point such as 10 on the sleeve tracing a closed curve path 11 shown in Fig. 5.

The engine A has a cylinder block 12 formed with the customary spaced bores or cylinders 13 only one of which is shown to avoid duplication. The cylinder 13 receives the sleeve valve 14 driven as aforesaid in any desirable manner as by the wobble valveshaft 15 driven at half crankshaft speed for the four stroke cycle engine illustrated. This valveshaft has a wobble crank 16 for each sleeve valve, the wobble crank being connected to the sleeve by link 17, ball and socket structures 18, 19 and 20 permitting the movement necessary to drive the sleeve valve with the aforesaid motion. Many other types of drives are well known in the art and such driving mechanism per se is not a part of this invention. Within the sleeve valve 14 is the usual piston 21 operating the crankshaft 22 through the connecting rod 23. The outer end of the cylinder is closed by a cylinder head structure B carrying spark plug 24 and providing a combustion chamber 25 preferably of the type lending itself to axial swirling of the carbureted fuel mixture of gasoline and air or other fluid to be conducted into the combustion chamber.

The cylinder block 12 is formed at opposite sides thereof with the fuel mixture intake and exhaust chambers 26 and 27 respectively, the exhaust chamber 27 directing or conducting exhaust gases from cylinder and sleeve exhaust ports 28 and 29 respectively to the chamber outlet 30 and exhaust manifold 31 when these ports coincide at the proper time. The intake chamber 26 conducts fuel mixture from the branch outlet 32 of intake manifold 33 to the plurality of cylinder intake ports 34, 35, 36, 37 and 38 spaced circumferentially of cylinder 13 in the wall thereof. The cylinder intake ports respectively open to the cooperating sleeve valve intake ports 39, 40, 41, 42 and 43 at the proper time of the sleeve valve travel, as when the sleeve valve motion is largely oscillatory, illustrated in Fig. 5. In Figs. 2, 5, 6 and 7 the cylinder and sleeve intake ports are shown opening by the respective vertical edges of the ports whereby the fuel mixture tends to enter the cylinder or combustion chamber tangentially to produce a swirling motion of the fuel mixture in a direction indicated by arrow 44 opposite to the oscillatory sleeve motion indicated by arrow 45. While I have shown five cylinder and intake ports I desire it to be understood that other numbers or ports may be used if desired, it being often customary in this type of engine to provide three intake ports.

With the ports arranged as thus far described the ports 39, 40 and 41 tend to introduce the fuel mixture tangentially to provide counter-clockwise swirl (viewed as in Figs. 2 and 6) and the ports 42 and 43 tend to produce opposing clockwise swirl, the first group predominating to provide a net swirl indicated by arrow 44. With increasing engine speed and accompanying increased velocity of the fuel mixture stream in manifold branch 32′ and intake chamber 26 this counter-clockwise swirl greatly increases so that in the absence of controlling factors the maximum benefits of the swirl cannot be realized. Thus, if the swirl at higher speeds is of a speed affording the most desirable conditions of engine operation, then at lesser speeds the resulting decreasing swirl speeds result in engine power loss and other attendant inefficiencies compared to what can be obtained and realized with proper swirl conditions. Likewise if the swirl is obtained for maximum benefits at low engine speeds, then at higher engine speed the greatly increased swirl speeds will result in detonation, engine roughness and other undesirable engine characteristics.

I have provided a method and means for obtaining desired swirl conditions preferably automatically over the range of engine speeds, the embodiments illustrated directing the fuel mixture stream toward the intake ports in a way to reduce or minimize the effect of swirl due to tangential gas flow through the ports.

Thus, referring to Fig. 2, since the tangential effect of gas flow through ports 39, 40 and 42, 43 substantially balances itself with a relatively small amount of residual swirl, it remains to control the intermediate port 41 which is substantially opposite the intake manifold branch outlet 32 in the symmetrical arrangement of cylinder ports and intake chamber illustrated. For this purpose I form a central conduit 46 extending from an inlet 47 opposite outlet 32 to the outlet or central cylinder port 36, the conduit having, if desired, the smoothly converging walls to a restricted zone 48 for the purpose of accelerating the gas flow through the conduit and increase the engine volumetric efficiency.

Cooperating with ports 36 and 41 and conduit 46 is a gas deflector or movable swirl controlling means 49 herein comprising a light flexible metallic plate-like reed supported at its outer end 50 and freely movable at its inner end 51. The outer end 50 is formed with ears 52 engageable in slots 53 formed in the upper and lower walls 54 and 55 respectively of the intake chamber 26. Conduit 46 has one of its side walls 56 acting as an abutment to limit lateral deflection of reed 49, the other side wall 57 forming with reed 49 the effective gas or fuel mixture passageway of variable capacity as port 41 opens with port 36 as will be presently apparent.

Referring to Fig. 2ª I have shown the usual arrangement for central sleeve and cylinder ports 41 and 36 respectively, the gas flow being indicated by the arrows. The zone 58 in the intake chamber 26ª deflects the incoming fuel mixture 20 as to effect tangential entry through port 41 as indicated by arrow 59. Now, referring to Fig. 2 the reed 49 will, by reason of its extreme flexibility, follow the opening edge 60 of port 41 as the latter moves across port 36, the reed being automatically moved responsive to the gas flow and the quantity thereof passing through port 36. Thus as 41 opens the reed 49 swings from the position in Fig. 2 to a final position in Fig. 4 to provide maximum gas flow through the conduit 46 without hindering efficient gas flow. It will be understood that reed 49 is shown somewhat thicker for illustration than it would be in practice, this reed being of light spring steel stock of high resiliency and approximately ten thousandths of an inch in thickness or less. Thus reed 49 prevents the deflection of gases in zone 58 of Fig. 2ª by guiding the gases into substantially radial cylinder entry, thereby substantially eliminating or reducing the tangential gas entry at the central intake port.

In Fig. 6 I obtain substantially the same results as in Fig. 2, the only difference being that each pair of cooperating cylinder sleeve intake ports is formed with a cooperating conduit in the intake chamber 26ᵇ, these conduits being designated as 60, 61, 62 and 63. The conduits, like central conduit 46 each has a zone 64 restricted so as to increase the gas velocity.

In Fig. 7 the reed 49ª is secured by screw 65 to the entrance wall of the intake chamber 26ᶜ, the reed having an opening 66 best shown in Fig. 8, through which the gas or fuel mixture passes to the left group of ports. Chamber 26ᶜ has a depressed or vertically enlarged zone 67 permitting swinging movement of reed 49ª, the latter being shown in dotted lines in Fig. 7 for the fully open position of central sleeve intake port 41.

The swirl tendency from gas entry into the cylinder having been reduced to a desired residual amount, I now obtain the desired swirl over the engine fuel range independently of the fuel mixture stream which too greatly increases in velocity with increasing engine speed. Thus the clearance space 68 between piston 21 and wall 69 of cylinder head B provides for a swirl in the direction of the residual swirl aforesaid, whose angular velocity depends on the degree of clearance 68 determined as aforesaid or in any other convenient manner. While the swirl obtained by the piston clearance will increase with increasing engine speed, the swirl is under control by reason of minimizing the port entry swirl and good overall engine performance will result without excessive swirl at higher engine speeds.

It is not my intention to limit the scope of my invention to the embodiments illustrated, as various modifications and deviations therefrom within the scope of my invention will be apparent from the teachings of my invention. Thus, if desired, my fuel mixture or gas deflecting reed may be associated with more than one of the cylinder ports where the engine cylinder has a plurality of intake ports. Furthermore, if desired, the reed or reeds may be located at some other point or points in the gas conducting system whereby to have a controlling influence on fuel mixture characteristics in the engine cylinder.

Instead of being arranged to substantially neutralize the tendency toward swirl as hereinbefore described the reed or reeds may be arranged to only partially neutralize the swirl and at the same time exercise a controlling influence over the swirl tendencies whereby to effect a desired degree of residual swirl in the engine. By "residual swirl" I mean the net swirl resulting from gas entry into the cylinder prior to the additional swirl obtained by the piston compression stroke. This might be accomplished as illustrated in Fig. 9 in which the reed 49b has a concave form presented to the gas stream whereby the gas flow through the critical central port 36 is intermediate a swirl neutralizing direction as substantially or largely radial and a largely tangential direction as in Fig. 2a. Thus the gas flow is illustrated by arrow 59a in which instance an appreciable component or amount of counter clockwise swirl is induced by gas flow into the cylinder, this swirl increasing with increasing engine speeds. With such arrangement the piston clearance 68 is sufficient so as to prevent an aggravated condition of excess swirl, especially at higher engine speeds.

What I claim as my invention is:

1. In an internal combustion engine having a cylinder provided with a plurality of intake ports spaced circumferentially in the wall thereof, a single sleeve valve associated with said cylinder and having a combined axial reciprocation and oscillation, said sleeve valve having a plurality of intake ports spaced circumferentially in the wall thereof and adapted to register with the cylinder intake ports, fuel mixture conducting means for directing fuel mixture toward said cylinder and sleeve valve intake ports, said fuel mixture having a tendency to swirl in said cylinder, and fuel mixture deflecting means associated with one of said cylinder intake ports for movement in response to port opening for controlling said swirl.

2. In an internal combustion engine having a cylinder provided with a plurality of intake ports spaced circumferentially in the wall thereof, a single sleeve valve associated with said cylinder and having a combined axial reciprocation and oscillation, said sleeve valve having a plurality of intake ports spaced circumferentially in the wall thereof and adapted to register with the cylinder intake ports, fuel mixture conducting means for directing fuel mixture toward said cylinder and sleeve valve intake ports, said fuel mixture having a tendency to swirl in said cylinder, a movable reed associated with one of said cylinder intake ports whereby to lessen said swirling tendency.

3. In an internal combustion engine having a cylinder provided with a plurality of intake ports spaced circumferentially in the wall thereof, a single sleeve valve associated with said cylinder and having a combined axial reciprocation and oscillation, said sleeve valve having a plurality of intake ports spaced circumferentially in the wall thereof and adapted to register with the cylinder intake ports when the motion of the sleeve is mainly oscillatory thereby tending to establish swirl of the fuel mixture within the cylinder, fuel mixture conducting means for directing fuel mixture toward said cylinder and sleeve valve intake ports, and means movably responsive to fuel mixture flow through one of said cylinder intake ports for regulating said swirling tendency.

4. In an internal combustion engine having a cylinder provided with a plurality of intake ports spaced circumferentially in the wall thereof, a single sleeve valve associated with said cylinder and having a combined axial reciprocation and oscillation, said sleeve valve having a plurality of intake ports spaced circumferentially in the wall thereof and adapted to register with the cylinder intake ports, when the motion of the sleeve is mainly oscillatory thereby tending to establish swirl of the fuel mixture within the cylinder, fuel mixture conducting means for directing fuel mixture toward said cylinder and sleeve valve intake ports, and means positioned for movement adjacent and across one of said cylinder intake ports during said oscillatory sleeve movement.

5. In an internal combustion engine having a cylinder provided with a plurality of intake ports spaced circumferentially in the wall thereof, a single sleeve valve associated with said cylinder and having a combined axial reciprocation and oscillation, said sleeve valve having a plurality of intake ports spaced circumferentially in the wall thereof and adapted to register with the cylinder intake ports, fuel mixture conducing means for directing fuel mixture toward said cylinder and sleeve valve intake ports, said fuel mixture having a tendency to swirl in said cylinder, and a flexible spring reed supported in said fuel mixture conducting means, said reed having an end movably associated with one of said cylinder intake ports whereby to modify said swirl tendency.

6. In an internal combustion engine having a cylinder provided with a plurality of intake ports, valving means for said ports, gas conducting means for conducting gas to said intake ports, and means directing the gas toward one of said intake ports for controlling swirl in said cylinder, said directing means being movable in response to gas flow.

7. In an internal combustion engine having a cylinder provided with a plurality of intake ports, valving means for said ports, fuel mixture conducting means for conducting fuel mixture to said intake ports, and means actuated in response to movement of said valving means for controlling tendencies of the fuel mixture to swirl in said cylinder.

8. In an internal combustion engine having a cylinder provided with a plurality of intake ports, valving means for said ports, a fuel mixture conduit for conducting fuel mixture to said ports, said conduit having an inlet opening substantially symmetrically arranged with respect to said ports, and means associated with one of said ports for directing the fuel mixture toward said ports to control fuel mixture swirl within said cylinder.

9. In an internal combustion engine having a cylinder provided with a plurality of intake ports, valving means for said ports, fuel mixture conducting means for conducting fuel mixture to said ports, said conducting means having an inlet opening substantially symmetrically arranged with respect to said ports, and means movably associated with an intermediate port for directing the fuel mixture therethrough whereby to modify the tendency of the fuel mixture to swirl in said cylinder.

10. In an internal combustion engine having a cylinder provided with a plurality of intake ports, valving means for said ports, fuel mixture conducting means for conducting fuel mixture to said ports, said conducting means having an inlet opening substantially symmetrically arranged with respect to said ports, and movable means associated with one of said ports for substantially minimizing port swirl tendencies, and means responsive to engine operation for inducing fuel mixture swirl.

11. In an internal combustion engine having a cylinder provided with a plurality of intake ports, a chamber for conducting fuel mixture to said ports, valving means controlling said ports, and a conduit within said chamber leading to one of said ports, said conduit having a wall thereof movable in response to engine operation.

12. In an internal combustion engine having a cylinder provided with a plurality of intake ports, a chamber for conducting fuel mixture to said ports, valving means controlling said ports, and a conduit within said chamber leading to one of said ports, said conduit having a wall thereof movable in response to engine operation, said conduit being adapted to accelerate fuel mixture flow therethrough.

13. In an internal combustion engine having a cylinder provided with a plurality of intake ports, a chamber for conducting fuel mixture to said ports, valving means controlling said ports, a plurality of conduits within said chamber for individually conducting fuel mixture to said ports, and means within one of said conduits for controlling fuel mixture swirl within the cylinder.

14. In an internal combustion engine having a cylinder provided with a plurality of intake ports, valving means for said ports, fuel mixture conducting means for conducting fuel mixture to one of said intake ports and means movably associated with the last said intake port for directing the fuel mixture through said port for controlling fuel mixture swirl within said cylinder, said movable means extending across the path of the fuel mixture flow to another of said intake ports.

15. In an engine, valving means, gas conducting means, a cylinder having a gas inlet port arranged with respect to said valving means and said gas conducting means to induce swirl of the gas in the engine combustion chamber, said cylinder having a second gas inlet port arranged as aforesaid to induce gas swirl in the combustion chamber in opposition to the swirl induced by said first port, said cylinder having a third gas inlet port arranged as aforesaid to induce gas swirl in the combustion chamber substantially in the direction of swirl induced by said first inlet port, and means associated with said third port for controlling gas swirl in the combustion chamber.

16. In an engine of the swirl inducing type having a cylinder provided with a gas intake port, valve means cooperating with said port, and means movably associated with said port for controlling the swirl of said intake gas within the engine, said swirl controlling means having a movement substantially synchronized with the movement of said valve means.

17. In an engine having a ported cylinder, sleeve valve means associated therewith and provided with an intake port adapted to cooperate with said cylinder port and thereby tend to induce swirl of intake gas passing therethrough, and means movably associated with one of said ports for modifying said swirl tendency, said swirl modifying means having a flexible end portion adapted to sweep across said cylinder port.

18. In an engine having a ported cylinder, sleeve valve means associated therewith and provided with an intake port adapted to cooperate with said cylinder port and thereby tend to induce swirl of intake gas passing therethrough, and means pivotally associated with said cylinder port for modifying said swirl tendency, said swirl modifying means extending generally radially of the cylinder and having an inner end adapted to move across said cylinder port.

19. In an engine having a ported cylinder, sleeve valve means associated therewith and provided with an intake port adapted to cooperate with said cylinder port and thereby tend to induce swirl of intake gas passing therethrough, and a reed subjected to and flexed by the flow of said intake gas for modifying said swirl tendency.

20. In an engine, a cylinder, intake valving means for said cylinder, means for conducting an intake gas to said cylinder, and a reed subjected to and moved by the intake gas flow for controlling gas swirl within said cylinder.

21. In an engine, a cylinder, intake valving means for said cylinder, means for conducting an intake gas to said cylinder, and means movable under the influence of the flow of said intake gas for controlling gas swirl within said cylinder.

22. In an engine having a cylinder, means for tangentially introducing an intake gas to said cylinder to induce swirl therewithin, and means movable under the influence of intake gas flow for controlling said swirl.

23. In an engine having a cylinder, means for tangentially introducing an intake gas to said cylinder to induce swirl therewithin, and means movable under the influence of intake gas flow for controlling said swirl prior to entry thereof into said cylinder.

24. In an engine having a ported cylinder, sleeve valve means ported for cooperation with said cylinder port, and means separate from said sleeve valve means but movable in response to port opening thereof for imparting a directional movement to an intake gas entering said ports.

25. In an engine having a ported cylinder, sleeve valve means ported for cooperation with said cylinder port, and means separate from said sleeve valve means but movable in response to port opening thereof for imparting a substantially radial directional movement to an intake gas entering said ports.

26. In an engine having a cylinder and cooperating sleeve valve means of the type having a pair of cooperating ports tending to admit an intake gas substantially tangentially within the cylinder to cause gas swirl therewithin, means for modifying said gas entry whereby to cause substantially radial entry of said intake gas through said ports.

27. In an engine having a cylinder and cooperating sleeve valve means of the type having a pair of cooperating ports tending to admit an intake gas substantially tangentially within the cylinder to cause gas swirl therewithin, means for modifying said gas entry whereby to cause substantially radial entry of said intake gas through said ports, said means having movement progressively across said cylinder port.

28. In an engine, a conduit for supplying an intake gas to said engine, said conduit having a wall thereof movable in response to engine operation.

29. In an engine, a conduit for supplying an intake gas to said engine, said conduit having a wall thereof movable in response to engine operation whereby to influence the directional entry of said intake gas into said engine.

30. In an engine, a conduit for supplying an intake gas to said engine, said conduit having a wall thereof movable in response to engine operation, said wall being adapted to accelerate gas flow through said conduit.

ANDRE J. MEYER.